United States Patent [19]

Lipshultz et al.

[11] Patent Number: 4,925,551

[45] Date of Patent: * May 15, 1990

[54] PORTABLE WATER PURIFICATION SYSTEM INCLUDING ELECTRONIC MEMORY PANEL ASSEMBLY

[75] Inventors: Mitchell Lipshultz, Ft. Lauderdale, Fla.; Alfred J. Lipshultz, 4090 Lake Dr., Coconut Creek, Fla. 33309

[73] Assignee: Alfred J. Lipshultz, Coconut Creek, Fla.

[ * ] Notice: The portion of the term of this patent subsequent to Jul. 26, 2005 has been disclaimed.

[21] Appl. No.: 215,495

[22] Filed: Jul. 6, 1988

Related U.S. Application Data

[63] Continuation-in-part of Ser. No. 842,165, Mar. 21, 1986, Pat. No. 4,759,844.

[51] Int. Cl.$^5$ ................................................ C02F 9/00
[52] U.S. Cl. ..................... 210/140; 210/143; 210/257.2; 210/259; 210/266; 210/282; 210/284
[58] Field of Search ............... 210/138, 140, 143, 638, 210/663, 669, 681–688, 694, 241, 257.2, 259, 266, 282, 284, 321.1, 900; 364/500, 502; 307/141.4; 361/195

[56] References Cited

U.S. PATENT DOCUMENTS 4,759,844  7/1988  Lipschultz et al. ............... 210/257.2
4,801,375  1/1989  Padilla .................................. 210/143

*Primary Examiner*—Ivars Cintins
*Attorney, Agent, or Firm*—Charles E. Baxley

[57] ABSTRACT

An electronic memory panel assembly controls the operation of a portable water purification system which has a reverse osmosis unit having an inlet. The assembly includes a solenoid device with piping having an inlet end fitting for attachment to a source of water to be purified, an outlet end fitting for attachment to the inlet of the reverse osmosis unit, a normally closed valve in the piping, and a solenoid having terminals which when activated will open the valve to cause automatic operation of the purification system. The assembly also includes a control device for automatically controlling the solenoid in accordance with predetermined criteria. The control device has a timer, a relay 32, a first pair of leads connecting the timer, and the relay 32, a second pair of leads running from the relay 32 to the solenoid terminals, and a third pair of leads, one of which is at the same electrical potential as one of the first pair of leads and the other of which is at the same electrical potential as one of the second pair of leads. The third pair of leads is connectible to a power source. The timer determines when the solenoid is activated and deactivated.

1 Claim, 1 Drawing Sheet

PORTABLE WATER PURIFICATION SYSTEM INCLUDING ELECTRONIC MEMORY PANEL ASSEMBLY

RELATED APPLICATION

The present invention has particular utility in connection with a portable water purification system disclosed in our copending U.S. patent application Ser. No. 842,165 which was filed Mar. 21, 1986 and is now U.S. Pat. No. 4,759,844, having issue July 26, 1988 and of which the present Application is a continuation-in-part.

BACKGROUND OF THE INVENTION

This invention relates to an electronic memory panel assembly for use with a water purification system disclosed in the above-mentioned Patent. Such system is a miniature portable domestic water purifying system which operates under conventional water main pressure. The system has a reservoir for dispensing purified water, a reverse osmosis unit, an ion exchange unit, and an activated carbon filter unit. Each of the reservoir, the reverse osmosis unit, the ion exchange unit and the activated carbon filter unit has an inlet and an outlet, and tubular connections are provided between the water supply and the inlet of the reverse osmosis unit, and between the outlet of the reverse osmosis unit and the inlet of the ion exchange unit, and between the outlet of the ion exchange unit and the inlet of the activated carbon filter unit, and between the outlet of the activated carbon filter unit and between the outlet of the activated carbon filter unit and the reservoir inlet. The reservoir has a tap and an overflow port, and the reverse osmosis unit has an additional outlet for disposal of waste water (brine) therefrom. Each of the reverse osmosis unit, the ion exchange unit and the activated carbon filter unit is in the form of a replaceable cartridge.

As stated above, the system of the above-identified U.S. Pat. No. 4,759,844 is operable under conventional water main pressure.

The electronic memory panel assembly of the present invention is an electrically activated adjunct for use with a portable water purification system disclosed in U.S. Pat. No. 4,759,844.

More specifically, the inventive electronic memory panel assembly provides automatic maintenance for the portable water purification system, by providing periodic accelerated flow of water over the reverse osmosis unit to flush away any plaque, thus prolonging efficient operation of the reverse osmosis unit by eliminating the necessity of a more or less hit-or-miss manual flushing.

Furthermore, the inventive electronic memory panel assembly makes the water purification system an on-demand system which causes the system to operate only when purified water is needed. Biweekly maintenance procedures heretofore necessarily performed by the consumer are no longer required. Instead, the inventive electronic memory panel assembly causes these procedures to be performed automatically when needed.

The end result is less work for the consumer, more efficient operation of the water purification system and increased life of the replaceable cartridges of the reverse osmosis unit, the ion exchange unit and the activated carbon filter unit.

Accordingly, it is an important object of the invention to provide an electronic memory panel assembly which includes automatic maintenance for a portable water purification system by providing periodic accelerated flow of water over the reverse osmosis unit of the system to flush away any plaque, thus prolonging efficient operation of the reverse osmosis unit.

It is another important object of the invention to avoid more or less hit-or-miss manual flushing of the reverse osmosis unit.

It is a further object of the invention to provide such a panel assembly which will make the water purification system with which it is used an on-demand system which produces only needed purified water, which will avoid the biweekly maintenance procedures which have been heretofore necessarily performed by the consumer, and which will cause those procedures to be performed automatically when needed.

It is yet another object of the invention to require less work for the consumer, a more efficient operation of the portable water purification system and increased life of the replaceable cartridges furnishing the reverse osmosis unit, the ion exchange unit and the activated carbon filter unit.

The above and additional objects and advantages will appear hereinafter.

SUMMARY OF THE INVENTION

The present invention presents an electronic memory panel assembly which controls the operation of a portable water purification system which has a reverse osmosis unit having an inlet. The inventive assembly includes a solenoid device with piping having an inlet end fitting for attachment to a source of water to be purified, an outlet end fitting for attachment to the inlet of the reverse osmosis unit, a normally closed valve in the piping and a solenoid having terminals which when activated will open the valve to cause automatic operation of the purification system.

The assembly also includes a control device for automatically controlling the solenoid at a presettable time interval. The control device has a timer, a relay 32, a first pair of leads connecting the timer and the relay 32, a second pair of leads running from the relay 32 to the solenoid terminals, and a third pair of leads one of which is at the same electrical potential as one of the first pair of leads and the other of which is at the same electrical potential as one of the second pair of leads. The third pair of leads is connectible to a power source for activating the solenoid when the timer closes the overall control circuit and for deactivating the solenoid when the timer opens the overall control circuit.

DESCRIPTION OF THE INVENTION

Figure 1:
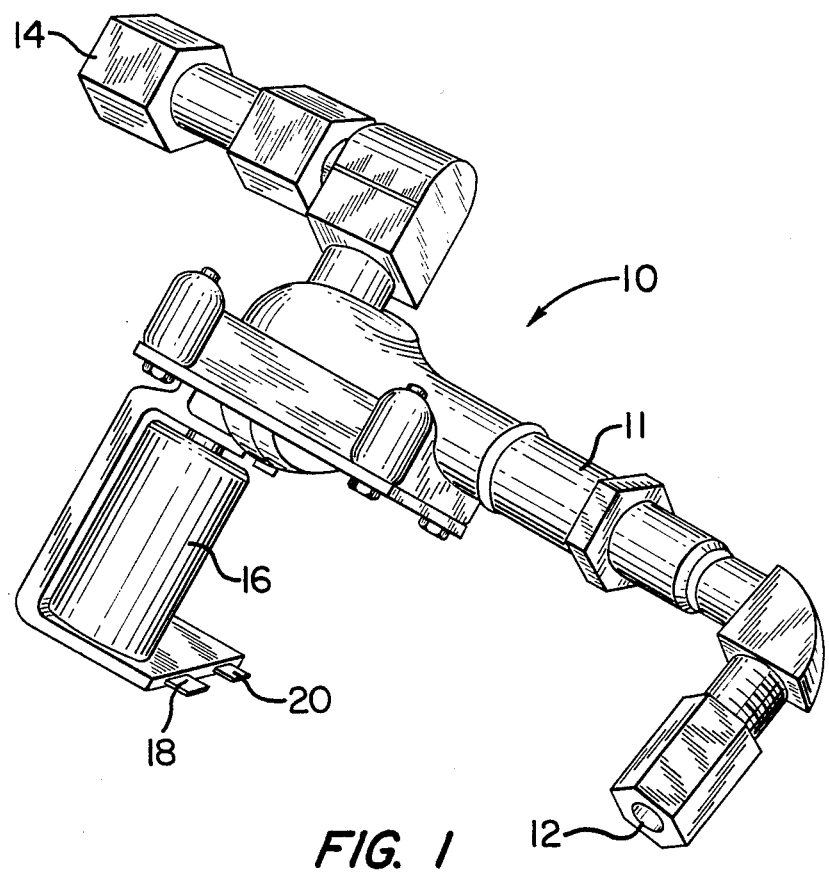
FIG. 1 is a perspective view of a piping assembly with solenoid which is a first component of a preferred embodiment of the invention.

FIG. 1 shows in perspective a solenoid device 10 which is a first component of a preferred embodiment of the invention. Device 10 has piping 11 having an inlet end fitting 12 connectible to a source of water which is to be purified by a system such as that of the aforesaid U.S. Pat. No. 4,759,844. Piping 11 also has an outlet end fitting 14 connectible to the brine line of the reverse osmosis unit of the system.

Device 10 further has a solenoid 16 with insulated flat blade male terminals 18 and 20. Solenoid 16 controls a valve (not shown) in the water line between inlet 12 and outlet 14, in known fashion. The valve is normally closed, but when electric power is applied to terminals 18 and 20, solenoid 16 is energized to cause the valve to open, to permit water to flow from the source of water into the reverse osmosis unit, thus flushing plaque from the reverse osmosis unit and activating the water purifying process.

It will be noted that device 10 regulates the water purification system with its source of water.

Figure 2:
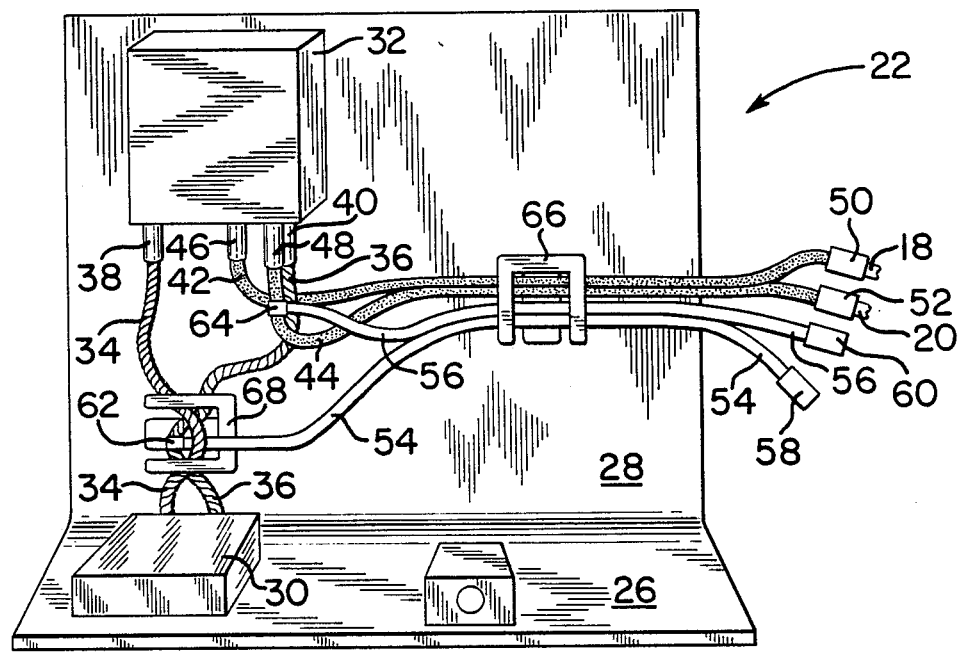
FIG. 2 is a perspective face view of a second component of the preferred embodiment of the invention.

FIG. 2 is a perspective face view of a control device 22 which is a second component of the preferred embodiment, and which provides means for automatically controlling solenoid 16 at presettable time intervals. Device 22 has a panel which may be of translucent material such as acrylic and which has a base portion 26 and an upright portion 28. A timer 30, of known design and operation mounted on base portion 26 and a relay 32 is mounted on upright portion 28. A pair of yellow leads 34 and 36 connect timer 30 and terminals 38 and 40, respectively, on relay 32. A pair of black leads 42 and 44 run from terminals 46 and 48, respectively, on relay 32 to insulated female terminals 50 and 52, respectively. Terminals 50 and 52 of black leads 42 and 44 are as shown in FIG. 2 releasably connected to male terminals 18 and 20, respectively, of solenoid device 10. A pair of white leads 54 and 56 run from insulated male terminals 58 and 60, respectively, to taps 62 and 64, respectively. Tap 62 connects white lead 54 to yellow lead 36 and tap 64 connects white lead 56 to black lead 44. Thus, white lead 54 is electrically connected to yellow lead 36 and white lead 44. The various leads are releasably held against upright portion 28 by clips 66 and 68.

In use terminals 58 and 60 of white leads 54 and 56 are connected to a suitable source of power (not shown) which is applied to yellow lead 36 and thereby to timer 30 and relay 32 and to black lead 44 and thereby to relay 32 and terminal 42. Also, terminals 50 and 52 of black leads 42 and 44 are connected to male terminals 18 and 20 of solenoid 16 as shown in FIG. 2 and end fittings 12 and 14 are connected, respectively, to a source of water which is to be purified and to the brine of the reverse osmosis unit of the system.

At this point, device 22 will control solenoid 16 to perform the functions as described above.

It is apparent that the invention well attains the foregoing objects and advantages and others.

The disclosed details are exemplary only and are not to be taken as limitations on the invention except as those details may be included in the appended claims.

What is claimed is:

1. A miniature portable domestic water purifying system adapted to operate under conventional water main pressure in a kitchen for dispensing purified water and comprising:

a housing provided with a reservoir for purified water and a process compartment, a reverse osmosis unit in the form of a replaceable cartridge and positioned in the process compartment, an ion exchange unit in the form of a replaceable cartridge and positioned in the process compartment, an activated carbon filter in the form of a replaceable cartridge and positioned in the process compartment, each of the reservoir and the reverse osmosis unit and the ion exchange unit and the activated carbon filter provided with an inlet and an outlet, water communication connected between:
  (i) the outlet of the reverse osmosis unit and the inlet of the ion exchange unit, and between
  (ii) the outlet of the ion exchange unit and the inlet of the activated carbon filter, and between
  (iii) the outlet of the activated carbon filter and the inlet of the reservoir, the reservoir provided with a tap and an overflow port, the reverse osmosis unit provided with a brine disposal outlet for disposal of waste brine therefrom, the water purifying system further comprising:

a control device including piping having an inlet end fitting for attachment to a water supply and an outlet end fitting for attachment to the inlet of the reverse osmosis unit, a normally closed valve in the piping, a solenoid in the control device and having male terminals which when energized activate the solenoid to open said valve to flush the reverse osmosis unit via the brine disposal outlet, an adjustable presettable timer, a relay, a first pair of electrical leads connecting the timer and the relay, a second pair of electrical leads connecting the relay to female terminals which are releasably connectable to the male terminals for operation of the solenoid, a third pair of electrical leads one of which is connected by a tap to one of the first pair of leads and the other of which is connected by a tap to one of the second pair of leads, and the third pair of leads being connectable to a source of electrical power.

* * * * *